US012707197B2

(12) United States Patent
McGrath

(10) Patent No.: US 12,707,197 B2
(45) Date of Patent: Aug. 11, 2026

(54) PROCESSING OF MICROPHONE SIGNALS FOR SPATIAL PLAYBACK

(71) Applicant: DOLBY LABORATORIES LICENSING CORPORATION, San Francisco, CA (US)

(72) Inventor: David S. McGrath, Rose Bay (AU)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 60 days.

(21) Appl. No.: 18/826,115

(22) Filed: Sep. 5, 2024

(65) Prior Publication Data

US 2025/0071479 A1 Feb. 27, 2025

Related U.S. Application Data

(63) Continuation of application No. 18/352,197, filed on Jul. 13, 2023, now Pat. No. 12,089,015, which is a (Continued)

(30) Foreign Application Priority Data

May 13, 2016 (EP) .................................... 16169658

(51) Int. Cl.
*H04R 3/00* (2006.01)
*H04R 1/40* (2006.01)
*H04R 5/04* (2006.01)

(52) U.S. Cl.
CPC ............. *H04R 3/005* (2013.01); *H04R 1/406* (2013.01); *H04R 5/04* (2013.01); *H04R 2499/11* (2013.01)

(58) Field of Classification Search
CPC .......... H04R 3/005; H04R 1/406; H04R 5/04; H04R 2499/11; H04R 2430/03;
(Continued)

(56) References Cited

U.S. PATENT DOCUMENTS 7,970,564 B2 6/2011 Wang
8,050,717 B2 11/2011 Sugiyama
(Continued)

FOREIGN PATENT DOCUMENTS

EP 2560161 A1 2/2013
EP 2539889 A1 8/2016
(Continued)

OTHER PUBLICATIONS

Epain, N. et al "Sparse Recovery Method for Dereverberation" Reverb Workshop, May 10, 2014, pp. 1-5, XP055366745.
(Continued)

*Primary Examiner* — Xu Mei

(57) ABSTRACT

Disclosed are methods and systems which convert a multi-microphone input signal to a multichannel output signal making use of a time-and frequency-varying matrix. For each time and frequency tile, the matrix is derived as a function of a dominant direction of arrival and a steering strength parameter. Likewise, the dominant direction and steering strength parameter are derived from characteristics of the multi-microphone signals, where those characteristics include values representative of the inter-channel amplitude and group-delay differences.

2 Claims, 5 Drawing Sheets

Related U.S. Application Data continuation of application No. 17/583,114, filed on Jan. 24, 2022, now Pat. No. 11,706,564, which is a continuation of application No. 15/999,764, filed as application No. PCT/US2017/018082 on Feb. 16, 2017, now Pat. No. 11,234,072.

(60) Provisional application No. 62/297,055, filed on Feb. 18, 2016.

(58) Field of Classification Search
CPC ............... G10L 19/008; H04S 2400/03; H04S 2400/15; H04S 5/00; H04S 2420/07
USPC ..................................... 381/91, 92, 122, 119
See application file for complete search history.

(56) References Cited

U.S. PATENT DOCUMENTS

| | | | | |
|---|---|---|---|---|
| 8,144,896 | B2 | 3/2012 | Liu | |
| 8,145,499 | B2 | 3/2012 | Herre | |
| 8,175,291 | B2 | 5/2012 | Chan | |
| 8,223,988 | B2 | 7/2012 | Wang | |
| 8,332,229 | B2 | 12/2012 | Samsudin | |
| 8,483,418 | B2 | 7/2013 | Platz | |
| 8,873,764 | B2 | 10/2014 | Kuech | |
| 8,929,558 | B2 | 1/2015 | Engdegard | |
| 9,025,782 | B2 | 5/2015 | Erik | |
| 9,047,861 | B2 | 6/2015 | Ma | |
| 9,129,593 | B2 | 9/2015 | Ojala | |
| 9,173,048 | B2 | 10/2015 | Mcgrath | |
| 10,339,908 | B2 | 7/2019 | Juha | |
| 10,348,264 | B2 | 7/2019 | Wang | |
| 10,726,830 | B1 | 7/2020 | Mandal | |
| 11,234,072 | B2 | 1/2022 | Mcgrath | |
| 11,706,564 | B2 | 7/2023 | Mcgrath | |
| 11,785,408 | B2 * | 10/2023 | Laitinen | G10L 25/21 381/23 |
| 12,089,015 | B2 * | 9/2024 | McGrath | H04R 1/406 |
| 12,494,211 | B2 * | 12/2025 | Breebaart | G10L 19/008 |
| 2003/0112983 | A1 | 6/2003 | Rosca | |
| 2007/0025562 | A1 | 2/2007 | Zalewski | |
| 2009/0086998 | A1 | 4/2009 | Jeong | |
| 2009/0306973 | A1 | 12/2009 | Hiekata | |
| 2011/0033063 | A1 | 2/2011 | Mcgrath | |
| 2012/0020482 | A1 | 1/2012 | Kim | |
| 2013/0044894 | A1 | 2/2013 | Samsudin | |
| 2013/0173273 | A1 | 7/2013 | Kuntz | |
| 2013/0195276 | A1 | 8/2013 | Ojala | |
| 2013/0272538 | A1 | 10/2013 | Kim | |
| 2013/0272548 | A1 | 10/2013 | Erik | |
| 2014/0029758 | A1 | 1/2014 | Nakadai | |
| 2014/0233762 | A1 | 8/2014 | Juha | |
| 2014/0286497 | A1 | 9/2014 | Thyssen | |
| 2016/0019899 | A1 | 1/2016 | Kristofer | |

FOREIGN PATENT DOCUMENTS

| | | | |
|---|---|---|---|
| WO | 2007096808 | A1 | 5/2007 |
| WO | 2010/019750 | A1 | 2/2010 |
| WO | 2014/147442 | A1 | 9/2014 |
| WO | 2015/036350 | A1 | 3/2015 |

OTHER PUBLICATIONS

Epain, N. et al "Super-Resolution Sound Field Imaging with Sub-Space Pre-Processing" IEEE International Conference on Acoustics, Speech and Signal Processing, May 26-31, 2013, pp. 350-354.

Erlach, B. et al "Aspects of Microphone Array Source Separation Performance" AES Convention, Spatial Audio Processing, Oct. 25, 2012, pp. 1-6.

Ibrahim, K. et al "Primary-Ambient Extraction in Audio Signals Using Adaptive Weighting and Principal Component Analysis" 13th Sound and Music Computing Conference and Summer School, Aug. 31, 2016, pp. 1-6.

Iwaki, M. et al "A Selective Sound Receiving Microphone System Using Blind Source Separation" AES Convention Microphone Technology and Usage, Feb. 1, 2000, pp. 1-12.

Ng, Samuel Samsudin, et al "Frequency Domain Surround Sound Production from Coincident Microphone Array with Directional Enhancement" AES 55th International Conference, Spatial Audio, Aug. 26, 2014, pp. 1-5.

Nikunen, J. et al "Direction of Arrival Based Spatial Covariance Model for Blind Sound Source Separation" IEEE/ACM Transactions on Audio, Speech, and Language Processing, vol. 22, No. 3, Mar. 2014, pp. 727-739.

Sun, H. et al "Optimal Higher Order Ambisonics Encoding with Predefined Constraints" IEEE Transactions on Audio, Speech, and Language Processing, vol. 20, No. 3, Mar. 2012, pp. 742-754.

Talantzis, F. et al "Estimation of Direction of Arrival Using Information Theory" IEEE Signal Processing Letters, vol. 12, No. 8, Aug. 2005, pp. 561-564.

Vilkamo, J. et al "Minimization of Decorrelator Artifacts in Directional Audio Coding by Covariance Domain Rendering" JAES vol. 61, Issue 9, pp. 637-646, Oct. 1, 2013.

Vilkamo, J. et al "Optimal Mixing Matrices and Usage of Decorrelators in Spatial Audio Processing" 45th International Conference: Applications of Time-Frequency Processing in Audio, Mar. 2012, paper No. 2-6.

Zhu, B. et al "The Conversion from Stereo Signal to Multichannel Audio Signal Based on the DMS System" IEEE Seventh International Symposium on Computational Intelligence and Design, Dec. 13-14, 2014, pp. 88-91.

* cited by examiner

PROCESSING OF MICROPHONE SIGNALS FOR SPATIAL PLAYBACK

CROSS-REFERENCE TO RELATED APPLICATIONS

This application is a continuation of U.S. patent application Ser. No. 18/352,197, filed Jul. 13, 2023, which is a continuation of U.S. patent application Ser. No. 17/583,114 filed Jan. 24, 2022, which issued as U.S. Pat. No. 11,706, 564, which is a continuation of U.S. patent application Ser. No. 15/999,764 filed Aug. 20, 2018, which issued as U.S. Pat. No. 11,234,072 on Jan. 25, 2022, which is U.S. National Stage of International Application No. PCT/US2017/ 018082, filed Feb. 16, 2017, which claims priority to U.S. Provisional Patent Application No. 62/297,055, filed on Feb. 18, 2016 and EP patent application Ser. No. 16/169,658.8, filed on May 13, 2016, each of which is incorporated herein by reference in its entirety.

TECHNICAL FIELD

The present disclosure generally relates to audio signal processing, and more specifically to the creation of multi-channel soundfield signals from a set of input audio signals.

BACKGROUND

Recording devices with two or more microphones are becoming more common. For example, mobile phones as well as tablets and the like commonly contain 2, 3 or 4 microphones, and the need for increased quality audio capture is driving the use of more microphones on recording devices.

The recorded input signals may be derived from an original acoustic scene, wherein the source sounds created by one or more acoustic sources are incident on M microphones (where M≥2). Hence, each of the source sounds may be present within the input signals according to the acoustic propagation path from the acoustic source to the microphones. The acoustic propagation path may be altered by the arrangement of the microphones in relation to each other, and in relation to any other acoustically reflecting or acoustically diffracting objects, including the device to which the microphones are attached.

Broadly speaking, the propagation path from a distant acoustic source to each microphone may be approximated by a time-delay and a frequency-dependant gain, and various methods are known for determining the propagation path, including the use of acoustic measurements or numerical calculation techniques.

It would be desirable to create multi-channel soundfield signals (composed of N channels, where N≥2) so as to be suitable for presentation to a listener, wherein the listener is presented with a playback experience that approximates the original acoustic scene.

SUMMARY

Example embodiments disclosed herein propose a solution of audio signal processing which create multi-channel soundfield signals (composed of N channels, where N≥2) so as to be suitable for presentation to a listener, wherein the listener is presented with a playback experience that approximates the original acoustic scene. In one example embodiment, a method and/or system which converts a multi-microphone input signal to a multichannel output signal makes use of a time-and frequency-varying matrix. For each time and frequency tile, the matrix is derived as a function of a dominant direction of arrival and a steering strength parameter. Likewise, the dominant direction and steering strength parameter are derived from characteristics of the multi-microphone signals, where those characteristics include values representative of the inter-channel amplitude and group-delay differences. Embodiments in this regard further provide a corresponding computer program product.

These and other advantages achieved by example embodiments disclosed herein will become apparent through the following descriptions.

BRIEF DESCRIPTION OF THE DRAWINGS

Through the following detailed description with reference to the accompanying drawings, the above and other objectives, features and advantages of example embodiments disclosed herein will become more comprehensible. In the drawings, several example embodiments disclosed herein will be illustrated in an example and non-limiting manner, wherein.

Throughout the drawings, the same or corresponding reference symbols refer to the same or corresponding parts.

DETAILED DESCRIPTION OF EXAMPLE EMBODIMENTS

This disclosure is concerned with the creation of multi-channel soundfield signals from a set of input audio signals. The audio input signals may be derived from microphones arranged to form an acoustic capture device.

According to this disclosure, multi-channel soundfield signals (composed of N channels, where N≥2) may be created so as to be suitable for presentation to a listener. Some non-limiting examples of multi-channel soundfield signals may include:

Stereo signals (N=2 channels)

Surround signals (such as N=5 channels)

Ambisonics signals (N=4 channels)

Higer Order Ambisonics signals (N>4 channels)

Figure 1:
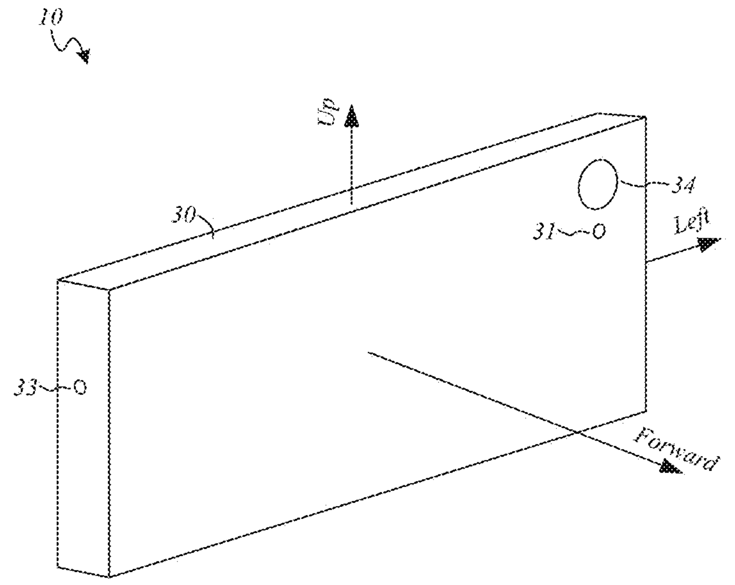
FIG. 1 illustrates an example of a acoustic capture device including a plurality of microphones suitable for carrying out example embodiments disclosed here.

An example of an acoustic capture device 10, is shown in FIG. 1. Acoustic capture device 10 may be for example, a smart phone, tablet or other electronic device The body, 30, of the acoustic capture device 10 may be oriented as shown in FIG. 1, in order to capture a video recording and an accompanying audio recording. For reference and illustration purposes, the primary camera 34 is shown.

Also, for illustration purposes microphones are disposed on or inside the body of the device in FIG. 1, with acoustic openings 31 and 33 indicating the locations of two microphones. That is, the locations of acoustic openings 31 and 33 is merely provided for illustration purposes and are in no way limited to the specific locations shown in FIG. 1. In the following discussion, the number of microphone signals is assumed to be M=3, with one of the microphones not visible in the diagram shown in FIG. 1. This disclosure describes methods applicable to any plurality of microphone signals, M≥2.

For reference, the Forward, Left and Up directions are indicated in FIG. 1. In subsequent descriptions in this disclosure, the Forward, Left and Up directions will also be referred to as the X, Y and Z axes, respectively, for the purpose of identifying the location of acoustic sources in Cartesian coordinates relative to the centre of the body of the capture device.

Figure 2:
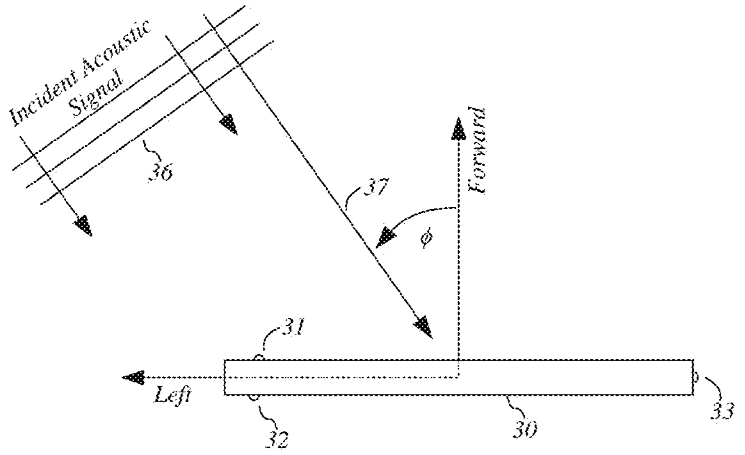
FIG. 2 illustrates a top-down view of the acoustic capture device in FIG. 1 showing an incident acoustic signal in accordance with example embodiments disclosed herein.

FIG. 2 shows a top-down view of the acoustic capture device 10 of FIG. 1, showing example locations of microphones 31, 32 and 33. In addition the acoustic waveform, 36, from an acoustic source is shown, incident from a direction, 37, represented by an azimuth angle $\phi$ (where $-100°\leq\phi\leq180°$), measured in a counter-clockwise direction from the Forward (X) axis. The direction of arrival may also be represented by a unit vector, $$\begin{pmatrix} x \\ y \end{pmatrix} = \begin{pmatrix} \cos\phi \\ \sin\phi \end{pmatrix} \tag{1}$$

In some situations, we may also represent the elevation angle of incidence of the acoustic waveform as $\theta$ (where $-90°\leq\theta\leq90°$). In this case, the direction of arrival may also be represented by a unit vector, $$\begin{pmatrix} x \\ y \\ z \end{pmatrix} = \begin{pmatrix} \cos\theta\cos\phi \\ \cos\theta\sin\phi \\ \sin\theta \end{pmatrix} \tag{2}$$

Each microphone (31, 32 and 33) will respond to the incident acoustic waveform with a varying time-delay and frequency response, according to the direction-of-arrival ($\phi$, $\theta$). An example impulse response is shown in FIG. 3, showing the signals (91, 92 and 93) at the three microphones (31, 32 and 33) when an impulsive plane-wave is incident on the device at $\phi=45°\theta=0°$, as illustrated in FIG. 2.

Figure 3:
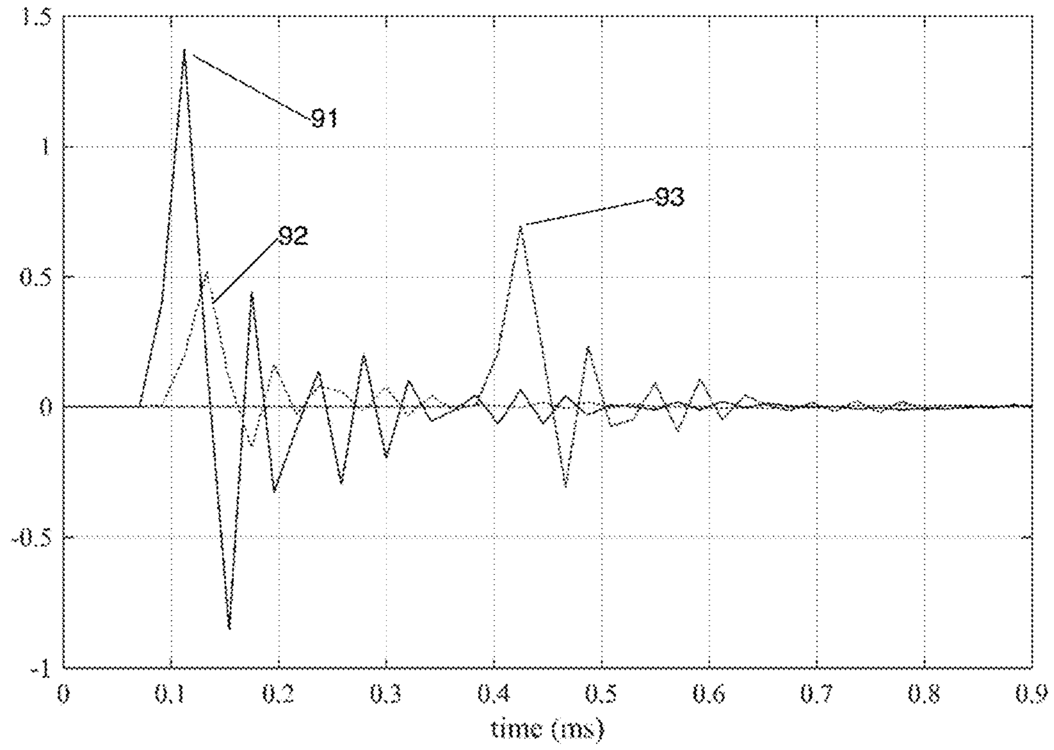
FIG. 3 illustrates a graph of the impulse responses of three microphones in accordance with example embodiments disclosed herein.
Figure 4:
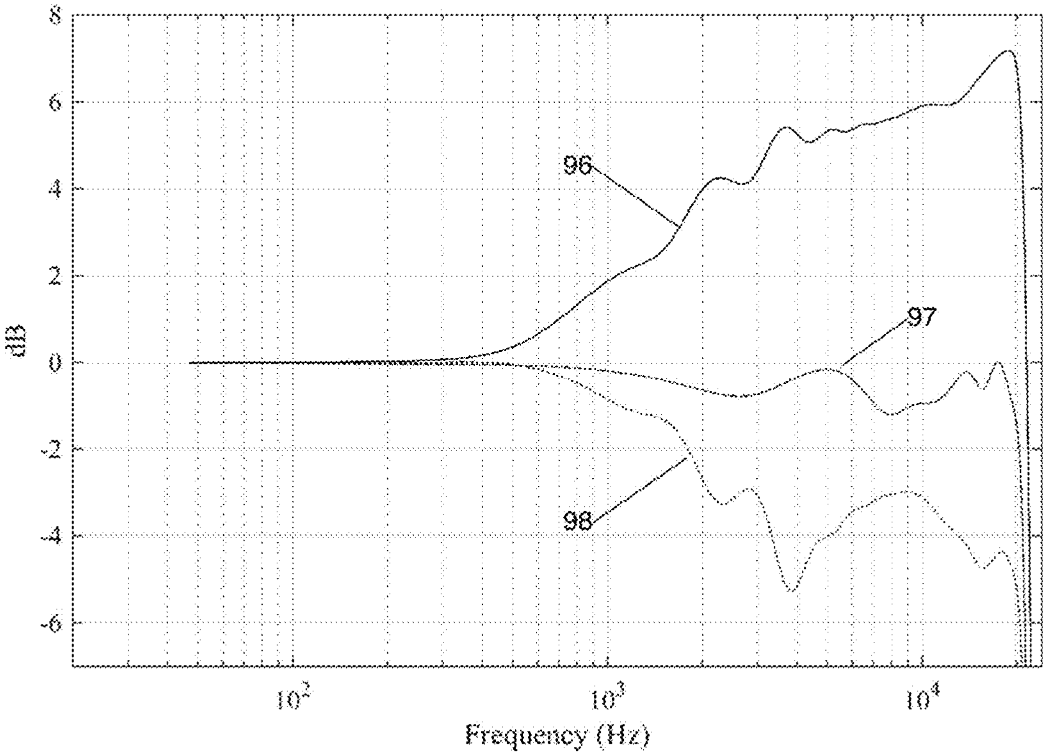
FIG. 4 illustrates a graph of the frequency response of three microphones in accordance with example embodiments disclosed herein.

FIG. 4 shown the frequency responses (96, 97 and 98), representing the respective impulse responses 91, 92 and 93 of FIG. 3.

Referring again to FIG. 3, the signal, 93, incident at microphone 33 can be seen to be delayed relative to the signal, 91, incident at microphone 31. This delay is approximately 0.3 ms, and is a side-effect of the physical placement of the microphones. Generally speaking, a device with a maximum inter-microphone spacing of L metres will contribute to inter-microphone delays up to a maximum of $$\tau \approx \frac{L}{c}$$

seconds, where c is the speed of sound in meters/second.

It may also be possible to derive an alternative estimate the maximum inter-microphone delay, $\tau$, from acoustic measurements of the device, or analysis of the geometry of the device.

Figure 5:
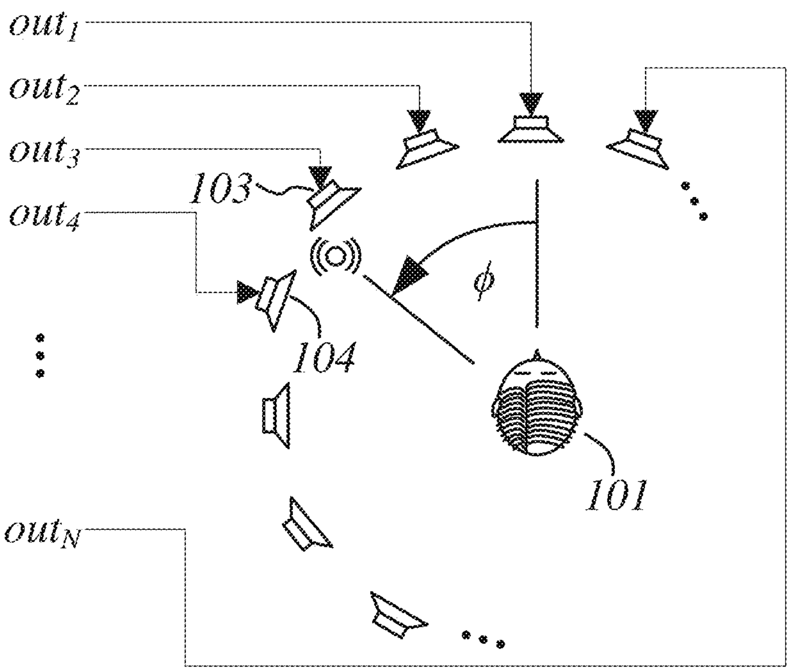
FIG. 5 illustrates a user's acoustic experience recreated using speakers in accordance with example embodiments disclosed herein.

In one example of a method, the multi-channel soundfield signals, $out_1$, $out_2$, . . . $out_N$, may be presented to a listener, 101, though a set of speakers as shown in FIG. 5, wherein each channel in the set of multi-channel soundfield signals represents the signal emitted by a corresponding speaker. It should be noted that the positioning of the listener, 101 as well as the set of speakers is merely provided for illustrative purposes and as such is merely a nonlimiting example embodiment.

The listener, 101, may be presented with the impression of an acoustic signal incident from azimuth angle $\phi$, as per FIG. 5, by panning the acoustic source sound to the $out_3$ and $out_4$ speaker channels. Some implementations disclosed herein may derive the appropriate speaker signals from the microphone input signals, according to a matrix mixing process.

Figure 6:
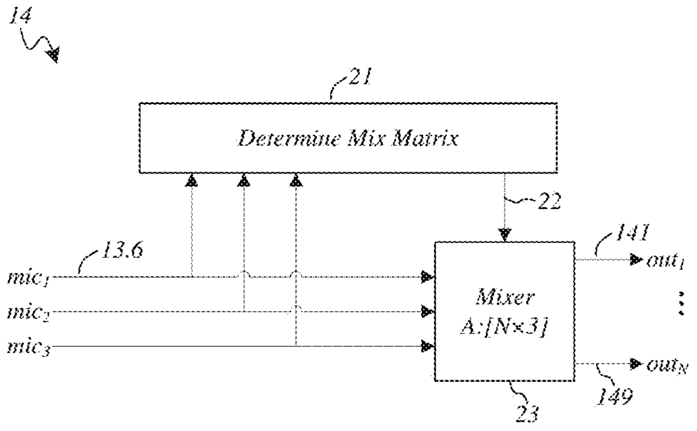
FIG. 6 illustrates an example of processing of one band according to a matrix in accordance with example embodiments disclosed herein.

FIG. 6 illustrates a method for the generation of N output signals ($out_1$, . . . $out_N$) from the M microphone input signals ($mic_1$, . . . $mic_M$), where M=3 in the example of FIG. 6. The microphone input signals, such as 13.6, are mixed to form the multi-channel soundfield signals, according to the [N×M] matrix, A:

$$\begin{pmatrix} \text{out}_1 \\ \vdots \\ \text{out}_N \end{pmatrix} = \begin{pmatrix} A_{1,1} & \cdots & A_{1,M} \\ \vdots & \ddots & \vdots \\ A_{N,1} & \cdots & N_{1,M} \end{pmatrix} \times \begin{pmatrix} mic_1 \\ \vdots \\ mic_M \end{pmatrix} \tag{3}$$

alternatively, Equation (3) may be expressed as:

$$\text{out} = A \times mic \tag{4}$$

According to Equation (3), the multi-channel soundfield signals are formed as a linear mixture of the microphone input signals. It will be appreciated, by those of ordinary skill in the art, that linear mixtures or audio signals are implemented according to a variety of different methods, including, but not limited to, the following:

1. Time domain signals may be mixed according to a fixed matrix:

$$\text{out}(t) = A \times mic(t)$$

2. Time domain signals may be mixed according to a time-varying matrix:

$$\text{out}(t) = A(t) \times mic(t)$$

3. Time domain input signals may be split into two or more frequency bands, with each band being processed by a different mixing matrix. For example, B filters may be used to split each of the input signals into B components signals. If we define the operator, $\text{Ban}_b\{\text{mic}\}$ to mean that filtering operation b (1≤b≤B) is applied to the set of microphone input signals, then B mixing matrices may be applied ($A_1, \ldots A_B$) as follows:

$$\text{out}(t) = \sum_{b=1}^{B} A_b(t) \times \text{Band}_b\{mic\}$$

Figure 7:
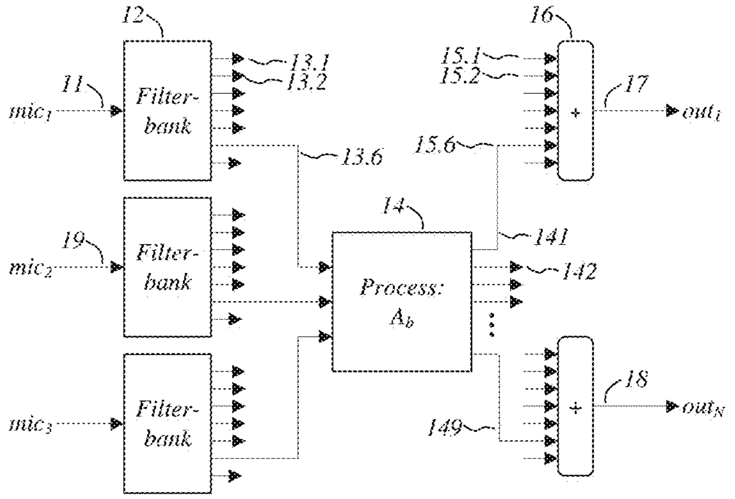
FIG. 7 illustrates an example of processing of one band of the audio signals in a multi-band processing system in accordance with example embodiments disclosed herein.

This method, whereby the input signals are split into multiple bands, and the processed results of each band are recombined to form the output signals, is illustrated in FIG. 7. As shown in FIG. 7, a microphone input, 11, is split into multiple bands (13.1, 13.2, . . . ) and each band signal, for example 13.6, is processed by processor block, 14, by way of one or more filter banks, 12 to create band output signals (141, 142, . . . ). Band output signals may then be recombined by combiner, 16, to produce the output signals, for example $\text{out}_1$, 17. It will also be appreciated from FIG. 7, that processing block, 14, is processing one band, by way example. In general, one such processing block, 14, will be applied for each one of the B bands. However, additional processing blocks may be incorporated into this method.

4. Input signals may be processed according to mixing matrices that are determined from time to time. For example, at periodic intervals (once every T seconds, say), a new value of A may be determined. In this case, the time-varying matrix is implemented by updating the matrix at periodic intervals. We may refer to this as 'block-based' processing, wherein block number k may correspond to the time interval kT≤t<(k+1)T, for example.

$$\text{out}(t) = A(k) \times mic(t) \text{where: } kT \le t < (k+1)T$$

5. The block-based processing, as described above, may be implemented by determining a frequency-domain representation of the input signal around block number k, and the frequency-domain representation of the multi-channel soundfield signals may be determined according a matrix operation. If we define the the frequency domain representations of the input signal and multi-channel soundfield signals to be Mic(k, ω) and Out(k, ω) respectively), then the matrix, A, may also be determined at each block, k, and at each frequency, ω, so that:

$$\text{Out}(k, \omega) = A(k, \omega) \times Mic(k, \omega)$$

6. The frequency domain method may also be implemented in a number of bands (B bands, say), and hence the matrix, A, may be determined at each block, k, and at each band, b, so that for any frequency, ω that lies within band b:

$$\text{Out}(k, \omega) = A(k, b) \times Mic(k, \omega)$$

It will be appreciated, by those of ordinary skill in the art, that the methods enumerated above are examples of the general principal whereby output signals may be formed by a linear mixture of input signals and whereby the mixing matrix may vary as a function of time and/or frequency, and furthermore the mixing matrix may be represented in terms of real or complex quantities.

Some example methods defined below may be considered to be applied in the form of mixing matrices that vary in both time and frequency. Without loss of generality, an example of a method will be described wherein a matrix, A(k, b), is determined at block k and band b, as per the linear mixing method number 6 above. In the following description, as a matter of shorthand, the matrix A(k, b) will be referred to as A. Also, in the following description, let band b be represented by discrete frequency domain samples: $\omega \in \{\omega_1, \omega_1+1 \ldots, \omega_2\}$.

Figure 9:
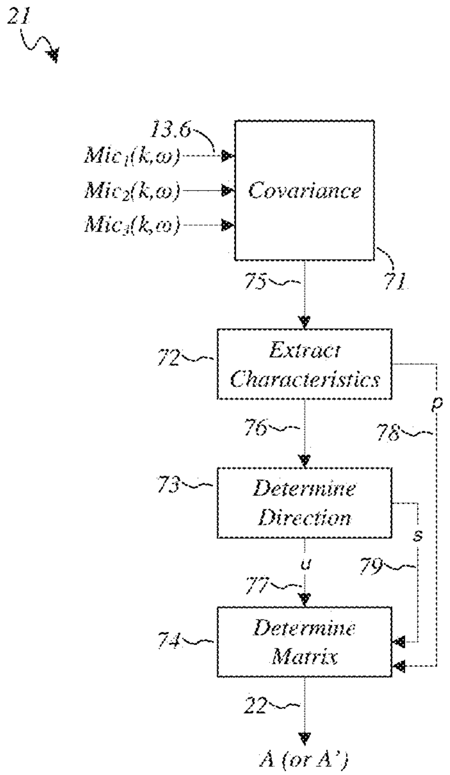
FIG. 9 illustrates an example of process for computing a matrix according to characteristics determined from microphone input signals in accordance with example embodiments disclosed herein.

According to one example of a method, the matrix A (k, b) is determined according to the multichannel microphone input signals, Mic(k, ω), by the procedure illustrated in FIG. 9, and according to the following steps:

1. Input to the process is in the form of multichannel microphone input signals, Mic(k, ω), corresponding to M channels ($\text{Mic}_1(k, \omega), \ldots, \text{Mic}_M(k, \omega)$), representing the microphone input at time-block k. and frequency range $\omega \in \{\omega_1, \omega_1+1, \ldots, \omega_2\}$. For example, $\text{Mic}_1(k, \omega)$ is shown, 13.6, in FIG. 9 as input to the Covariance process.
2. The Covariance process, 71, first determines the [M×M] instantaneous co-variance matrix:

$$Cov'(k, \omega) = Mic(k, \omega) \times Mic(k, \omega)^H = \begin{pmatrix} Mic_1(k, \omega)\overline{Mic_1(k, \omega)} & \cdots & Mic_1(k, \omega)\overline{Mic_M(k, \omega)} \\ \vdots & \ddots & \vdots \\ Mic_M(k, \omega)\overline{Mic_1(k, \omega)} & \cdots & Mic_M(k, \omega)\overline{Mic_M(k, \omega)} \end{pmatrix} \quad (5)$$

where $x^H$ indicates the conjugate-transpose of a column vector, and the $\overline{x}$ operation represents the complex conjugate of x.

3. The Covariance process, 71, then determines the time-smoothed co-variance matrix, Cov(k, ω), 75, according to:

$$Cov(k, \omega) = (1 - \lambda_\omega) \times Cov(k-1, \omega) + \lambda_\omega \times Cov'(k-1, \omega) \quad (6)$$

the smoothing constant $\lambda_\omega$ may be dependant on frequency (ω).

4. The Extract Characteristics process, 72, determines the delay-covariance matrix, D"(k, ω), according to:

$$D''(k, \omega) = |Cov(k, \omega)| \times \text{sign}\left(Cov(k, \omega + \delta_\omega) \times \overline{Cov(k, \omega - \delta_\omega)}\right) \quad (7)$$

where the function, sign(), is defined according to $$\operatorname{sign}(x)=\begin{cases}\frac{x}{|x|} & \text{when} x\in\mathbb{C}\backslash 0\\ 0 & \text{when} x=0\end{cases}$$

and the frequency offset parameter, $\delta_\omega$ is chosen to be approximately $$\delta_\omega \approx \frac{\pi}{3\tau}$$

radians per second, where $\tau$ is the maximum expected group-delay difference any two microphone input signals.

5. The Extract Characteristics process, 72, determines the band-characteristics matrix, D'(k, b), according to:

$$D'(k,b)=\sum\nolimits_{\omega=\omega_1}^{\omega_2} D''(k,\omega) \tag{8}$$

and then the Extract Characteristics process, 72, determines the normalized band-characteristics matrix, N(k, b) according to:

$$D(k,b)=\frac{1}{tr(D'(k,b))}\times D'(k,b) \tag{9}$$

where the operator, tr(D'), represents the trace of the matrix D'.

6. The Extract Characteristics process, 72, determines the square of the Frobenius norm, $p_b$, 78, of the normalized band-characteristics matrix:

$$p_b=\|D(k,b)\|_F^2=\sum\nolimits_{i=1}^{M}\sum\nolimits_{j=1}^{M} D(k,b)_{i,j} \tag{10}$$

This parameter, $p_b$, 78, will vary over the range $$\frac{1}{M}\leq p_b\leq 1.$$

When $p_b=1$, this corresponds to a multi-channel microphone input signal that originated from a single acoustic source in the acoustic scene. Alternatively, a different matrix norm may be used instead of the Frobenius norm, e.g. an $L_{2,1}$ norm or a max norm.

7. The [M×M] normalized band-characteristics matrix, D(k, b), will be a Hermitian matrix, as will be familiar to those of ordinary skill in the art. Hence, the information contained within this matrix will be represented in the form of M real elements in the diagonal along with $$\frac{M(M-1)}{2}$$

complex elements above the diagonal. The elements below the diagonal may be ignored, as they contain redundant information that is also carried in the elements above the diagonal. Hence the characteristic-vector, 76, may be formed as a column vector of length $M^2$, by concatenating the diagonal elements, the real part of the elements above the diagonal, and the imaginary part of the elements above the diagonal. For example, when M=3, we determine the characteristic-vector from the [3×3] normalized band-characteristics matrix according to:

$$C(k,b)=\begin{pmatrix} D(k)_{1,1}\\ D(k,b)_{2,2}\\ D(k,b)_{3,3}\\ \Re\mathfrak{e}(D(k,b)_{1,2})\\ \Re\mathfrak{e}(D(k,b)_{1,3})\\ \Re\mathfrak{e}(D(k,b)_{2,3})\\ \Im\mathfrak{m}(D(k,b)_{1,2})\\ \Im\mathfrak{m}(D(k,b)_{1,3})\\ \Im\mathfrak{m}(D(k,b)_{2,3}) \end{pmatrix} \tag{11}$$

8. The Determine Direction process, 73, is provided with the characteristic-vector, C(k, b), 76, as input, and determines the dominant direction of arrival unit-vector, $u_b$ 77, and a Steering parameter, $s_b$, 79, representative of the degree to which the microphone input signals appear to contain a single dominant direction of arrival. The function $V_b$ refers to the function that determines $u_b$:

$$u_b=V_b(C(k,b)) \tag{12}$$

The Steering parameter may be equal to $s_b=0$ when the microphone input signals contain no discernible dominant direction of arrival, according to the numerical values in the characteristic-vector, C(k, b), 76. The Steering parameter may be equal to $s_b=1$ when the microphone input signals are determined to consist of a singular dominant direction of arrival, according to the numerical values in the characteristic-vector, C(k, b), 76.

9. The Determine Matrix process, 74, determines the [N×M] mixing matrix, A(k, b), 22, as a function of the dominant direction of arrival, $u_b$, 77, the Steering parameter, $s_b$, 79, and the parameter, $p_b$, 78, according to the set of matrix-determining functions:

$$A_{n,m}(k,b)=F_{n,m,b}(u_b,s_b,p_b) \tag{13}$$

where the indices n and m correspond to output channel n and microphone input channel m, respectively, and where 1≤N≤N and 1≤m≤M.

The Covariance Process

In the previously described method, Steps 2-3 are intended to determine the normalized covariance matrix, and may be summarized in the form of a single function, K(), according to:

$$\operatorname{Cov}(k,\omega)=K(\operatorname{Cov}(k-1,\omega),Mic(k,\omega)) \tag{14}$$

wherein the function, K(), determines the normalized covariance matrix according to the process detailed in Steps 2-3 above.

The Extract Characteristics Process

In the previously described method, Steps 4-7 are intended to determine the characteristics-vector for one band, and may be summarized in the form of a single function, $J_b()$, according to:

$$C(k, b) = J_b(\mathrm{Cov}(k, \omega)) \tag{15}$$

wherein the function, $J_b()$, determines the characteristics-vector for band b according to the process detailed in Steps 4-7 above.

Determining Direction of Arrival

The estimated direction of arrival is computed as $u_b = V_b(C(k, b))$.

In one example of a method from implementing the function $V_b()$, the Determine Direction process, 73, first determines a direction vector, (x, y), for band b, according to a set of direction estimating functions, $G_{x,b}()$ and $G_{y,b}()$, and then determines the dominant direction of arrival unit-vector, $u_b$, and the Steering parameter, $s_b$, from (x, y), according to:

$$(x, y) = (G_{x,b}(C(k, b)), G_{y,b}(C(k, b))) \tag{16}$$

$$u_b = \frac{1}{\sqrt{x^2 + y^2}} \begin{pmatrix} x \\ y \end{pmatrix} \tag{17}$$

$$s_b = \min\left(\sqrt{x^2 + y^2}, \frac{1}{\sqrt{x^2 + y^2}}\right) \tag{18}$$

In the example methods described above, the dominant direction of arrival is specified as a 2-element unit-vector, $u_b$, representing the azimuth of arrival of the dominant acoustic component (as shown in FIG. 2), as defined in Equation (1).

In another example of a method, the Determine Direction process, 73, first determines a 3D direction vector, $u_b$, according to a set of direction estimating functions, $G_{x,b}()$, $G_{y,b}()$ and $G_{z,b}()$, and then determines the dominant direction of arrival unit-vector, $u_b$, and the Steering parameter, $s_b$, from (x, y, z), according to:

$$(x, y, z) = (G_{x,b}(C(k, b)), G_{y,b}(C(k, b)), G_{z,b}(C(k, b))) \tag{19}$$

$$u_b = \frac{1}{\sqrt{x^2 + y^2 + z^2}} \begin{pmatrix} x \\ y \\ z \end{pmatrix} \tag{20}$$

$$s_b = \min\left(\sqrt{x^2 + y^2 + z^2}, \frac{1}{\sqrt{x^2 + y^2 + z^2}}\right) \tag{21}$$

In equations 17 and 20 the vectors (x, y) and (x, y, z) are multiplied by a normalization factor. This normalization factor is also used to calculate the steering parameter $s_b$.

In one example of a method, $G_{x,b}()$, $G_{y,b}()$ and/or $G_{z,b}()$ may be implemented as polynomial functions of the elements in C(k). For example, a 2nd order polynomial may be constructed according to:

$$G_{x,b}(C(k)) = \sum_{i=1}^{M} \sum_{j=1}^{i} E^x_{i,j,b} C(k)_i C(k)_j \tag{22}$$

where the $$E^x_{i,j,b}$$

represents a set of $$\frac{M^2(M^2+1)}{2}$$

polynomial coefficients for each band, b, used in the calculation of $G_{x,b}(C(k))$, where $1 \le j \le i \le M$. Likewise, $G_{y,b}(C(k))$ may be calculated according to:

$$G_{y,b}(C(k)) = \sum_{i=1}^{M} \sum_{j=1}^{i} E^y_{i,j,b} C(k)_i C(k)_j \tag{23}$$

and, according to methods wherein the direction of arrival vector, u, is a 3-element vector, $G_{z,b}(C(k))$ may be calculated according to:

$$G_{z,b}(C(k)) = \sum_{i=1}^{M} \sum_{j=1}^{i} E^z_{i,j,b} C(k)_i C(k)_j \tag{24}$$

Determining the Mixing Matrix

In a further example method, the Determine Matrix process, 74, makes use of matrix-determining functions, $F_{n,m,b}(u_b, s_b, p_b)$ (as per Equation (13)) that are formed by combining together a fixed matrix value, $Q_{n,m,b}$, and a steered matrix function, $R_{n,m,b}(u)$, according to:

$$F_{n,m,b}(u_b, s_b, p_b) = (1 - s_b p_b) Q_{n,m,b} + s_b p_b R_{n,m,b}(u_b) \tag{25}$$

In one example of a method, each steered matrix function, $R_{n,m,b}(u_b)$, represents a polynomial function. For example, when the unit-vector, $u_b$, is a 2-element vector, $$u_b = \begin{pmatrix} x_b \\ y_b \end{pmatrix}; R_{n,m,b}(u_b)$$

may be defined as:

$$R_{n,m,b}(u_b) = (P_{b,0})_{n,m} + (P_{b,1})_{n,m} x_b + (P_{b,2})_{n,m} y_b + (P_{b,3})_{n,m} x_b^2 + (P_{b,4})_{n,m} x_b y_b \tag{26}$$

Equations (25) and (26) specify the behaviour of the matrix-determining functions, $F_{n,m,b}(u_b, s_b, p_b)$. These equations (along with Equation (13)) may be re-written in matrix form as, $$A(k, b) = F_b(u_b, s_b, p_b) \tag{27}$$

$$= (1 - s_b p_b) A_b + s_b p_b R_b(u_b) \tag{28}$$

$$= (1 - s_b p_b) Q_b + s_b p_b (P_{b,0} + P_{b,1} x_b + \tag{29}$$

-continued $$P_{b,2}y_b + P_{b,3}x_b^2 + P_{b,4}x_by_b)$$

Equation (29) may be interpreted as follows: In band b, the mixing matrix, A(k, b), will be equal to a pre-defined matrix, $Q_b$, whenever the multichannel microphone inputs contain acoustic components with no dominant direction of arrival (as this will result in $s_b \times p_b = 0$), and the mixing matrix, A(k, b), will be equal to polynomial function of $x_b$ and $y_b$ (the elements of the direction of arrival unit-vector) whenever the multichannel microphone inputs contain a single dominant direction of arrival.

In an exemplary embodiment, a mixing matrix is formed by a sum of a matrix Q which is independent of the dominant direction of arrival, multiplied by a first weighting factor, and a matrix R(u) which varies for different vectors u representative of the dominant direction of arrival, multiplied by a second weighting factor. The second weighting factor increases for an increase in the degree to which the multi-microphone input signal can be represented by a single direction of arrival, as represented by the steering strength parameter s, whereas the first weighting factor decreases for an increase in the degree to which the multi-microphone input signal can be represented by a single direction of arrival, as represented by the steering strength parameter s. For example, the second weighting factor may be a monotonically increasing function of the steering strength parameter s, while the first weighting factor may be a monotonically decreasing function of the steering strength parameter s. In a further example, the second weighting factor is a linear function of the steering strength parameter with a positive slope, while the first weighting factor is a linear function of the steering strength parameter with a negative slope.

The weighting factors may optionally also depend on the parameter $p_b$, for example by multiplying the steering strength parameter $s_b$ and the parameter $p_b$. The $R_b$ matrix dominates the mixing matrix if the soundfield was made up of only one source, so that the microphones are mixed to form a panned output signal. If the soundfield was diffuse, with no dominant direction of arrival, the Q matrix dominates the mixing matrix, and the microphones are mixed to spread the signals around the output channels. Conventional approaches, e.g. blind source separation techniques based on non-negative matrix factorization, try to separate all individual sound sources. However, when using such techniques for diffuse soundfields, the quality of the audio output decreases. In contrast, the present approach exploits the fact that a human's ability to hear the location of sounds becomes quite poor when the soundfield is highly diffuse, and adapts the mixing matrix in dependence on the degree to which the multi-microphone input signal can be represented by a single direction of arrival. Therefore, sound quality is maintained for diffuse sound fields, while directionality is maintained for sound field having a single dominant direction of arrival.

Data Arrays Representing Device Behaviour

According to one example of a method, the mixing matrix, A(k, b), may be determined, from the microphone input signals, according to a set of functions, K(), $J_b$, $G_{x,b}()$, $G_{y,b}()$, $G_{z,b}()$ and $R_b()$ and the matrix $Q_b$.

The implementation of the functions $G_{x,b}()$, $G_{y,b}()$ and $G_{z,b}()$ may be determined from the acoustic behaviour of the microphone signals. The function $R_b()$ and the matrix $Q_b$ may be determined from acoustic behaviour of the microphone signals and characteristics of the multi-channel soundfield signals.

In some examples of a method, the function $G_{z,b}()$ is omitted, as the direction or arrival unit-vector, $u_b$, may be a 2-element vector.

According to one example method, the behaviour of these functions is determined by first determining the multi-dimensional arrays: $\hat{u}_a$, $\hat{C}_{a,b}$, $\hat{A}_{a,b}$ according to:

1. Determine a set of W candidate direction of arrival vectors, $\{\hat{u}_a: a=1 \ldots W\}$. We may also represent each candidate direction of arrival vector in terms of 3D coordinates: $\hat{u}_a = (\hat{x}_a, \hat{y}_z, \hat{z}_a)^T$, or as 2D coordinates: $\hat{u}_a = (\hat{x}_a, \hat{y}_a)^T$. In one example of a method, a set of 2D candidate direction of arrival vectors may be chosen according to $$\hat{u}_a = \begin{pmatrix} \cos\frac{2\pi a}{W} \\ \sin\frac{2\pi a}{W} \end{pmatrix}.$$

2. For each a ε {1 . . . W}:
   (a) Determine an estimated acoustic response signal, $\widehat{Mic}_{a,m}(\omega)$, for each microphone, being the estimated signal at each microphone from an acoustic impulse that is incident on the capture device from the direction represented by $\hat{u}_a$. The estimate of $\widehat{Mic}_{a,m}(\omega)$ may be derived from acoustic measurements, or from numerical simulation/estimation methods.
   (b) Determine the estimated covariance: $\widehat{Cov}_a(\omega) = K(0, \widehat{Mic}_a(\omega))$, where $$\widehat{Mic}_a(\omega) = \begin{pmatrix} \widehat{Mic}_{a,1}(\omega) \\ \vdots \\ \widehat{Mic}_{a,M}(\omega) \end{pmatrix}.$$

(c) For each band, b, (where 1≤b≤B) determine the candidate characteristics-vector: $\hat{C}_{a,b} = J_b(\widehat{Cov}_a(\omega))$
   (d) Determine a desired spatial output signal for each output, $\widehat{Out}_{a,n}(\omega)$, representing the desired spatial output signals intended to create the desired playback experience (as per FIG. 5) for an acoustic source located in direction $\hat{u}_a$.
   (e) For each band, b, (where 1≤b≤B) determine a candidate mixing matrix, $\hat{A}_{a,b}$ being a matrix suitable for mixing the estimated microphone input signals, $\widehat{Mic}_a(\omega)$ to produce spatial output signals: $\widehat{Out}_{a,n}(\omega) \approx \hat{A}_{a,b} \times \widehat{Mic}^a(\omega)$, for ω ε {$\omega_1$, $\omega_1$+1, . . . , $\omega_2$} (where band b covers the frequency range between $\omega_1$ and $\omega_2$.

According to the method above, following arrays of data are determined:

$\hat{u}_a$: The [2×W] array consisting of W 2D unit-vectors (this is a [2×W] array when the direction vectors are 3D). This 2D array may also be represented as 2 (or 3) row vectors, each of length W: $\hat{x}_a$, $\hat{y}_a$ and (in instances where the direction of arrival vector $u_b$ is a 3D vector) $\hat{z}_a$.

$\hat{C}_{a,b}$: The [$M^2$×W×B] array consisting of W characteristics vectors, for each of B bands (where each characteristics vector is a $M^2$ length column vector).

$\hat{A}_{a,b}$: The [N×M×W×B] array consisting of W mixing matrices, for each of B bands (where each mixing matrix is a [N×M] matrix)

Direction Determining Function

In one example of a method, the function $V_b(C(k, b))$, as used in Equation (12), may be implemented by finding the candidate direction of arrival vector $\hat{u}_a$ according to:

$$V_b(C(k,b)) = u_a \quad (30)$$

$$\text{where: } a = \text{argmax}_a \frac{\hat{C}_{a,b}^T \times C(k,b)}{|\hat{C}_{a,b}||C(k,b)|} \quad (31)$$

This procedure effectively determines the candidate direction of arrival vector $\hat{u}_a$ for which the corresponding candidate characteristics vector $\hat{C}_{a,b}$ matches most closely to the actual characteristics vector C(k, b), in band b at a time corresponding to block k.

In an alternative example of a method, the function $V_b(C(k, b))$, as used in Equation (12), may be implemented by first evaluating the functions $G_{x,b}()$, $G_{y,b}()$ and (in instances where the direction of arrival vector $u_b$ is a 3D vector) $G_{z,b}()$. By way of example, $G_{x,b}()$ may be implemented as a polynomial according to Equation (22).

In one example of a method, $G_{x,b}()$ may be implemented as a second-order polynomial. This polynomial may be determined so as to provide an optimum approximation to:

$$\hat{x}_a \approx G_{x,b}(\hat{C}_{a,b}) \forall\, a \in \{1 \ldots W\} \quad (32)$$

$$\text{hence, } \hat{x}_a \approx \sum_{i=1}^{M} \sum_{j=1}^{i} E_{i,j,b}^x (\hat{C}_{a,b})_i (\hat{C}_{a,b})_j \forall\, a \in \{1 \ldots W\} \quad (33)$$

This approximation may be optimized, in a least-squares sense, according to the method of polynomial regression, which is well known in the art. Polynomial regression will determine the coefficients $$E_{i,j,b}^x$$

for band b ε {1 . . . B}, and for 1≤j≤i≤M.

Likewise, the functions $G_{y,b}()$ and (in instances where the direction of arrival vector $u_b$ is a 3D vector) $G_{z,b}()$ may be determined by polynomial regression, so that the coefficients $$E_{i,j,b}^y$$

and $$E_{i,j,b}^z$$

may be determined to allow least-squares optimised approximations to $\hat{y}_a \approx G_{y,b}(\hat{C}_{a,b})$ and $\hat{z}_z \approx G_{z,b}(\hat{C}_{a,b})$, respectively.

Mixing Matrix Determining Function

In one example of a method, the function $F_b(u_b, s_b, p_b)$, as used in Equation (13), may be implemented according to Equation (28). Equation (28) determines $F_b(u_b, s_b, p_b)$ in terms of the matrix $Q_b$ and the function $R_b(u_b)$.

According to one example of a method, $R_b(u_b)$ may implemented according to:

$$R_b(u_b) = \hat{A}_{a,b} \quad (34)$$

$$\text{where: } a = \text{argmax}_a (u_b^T \times \hat{u}_a) \quad (35)$$

This procedure effectively chooses the candidate mixing matrix $\hat{A}_{a,b}$ for band b that corresponds to the candidate direction of arrival vector $\hat{u}_a$ that is closest in direction to the estimated direction of arrival vector $u_b$.

In an alternative example of a method, the function $R_b(u_b)$ may be implemented as a polynomial function in terms of the coordinates of the unit-vector, $u_b$, according to:

$$R_b(u_b) = P_{b,0} + P_{b,1} x_b + P_{b,2} y_b + P_{b,3} x_b^2 + P_{b,4} x_b y_b \quad (36)$$

$$\text{where: } u_b = \begin{pmatrix} x_b \\ y_b \end{pmatrix}$$

The choice of the polynomial coefficient matrices ($P_{b,0}$, . . . , $P_{b,5}$) may be determined by polynomial regression, in order to achieve the least-square error in the approximation:

$$\hat{A}_{a,b} \approx R_b(\hat{u}_a) \forall\, a \in \{1 \ldots W\} \quad (37)$$

this is equivalent to the least squares minimisation of:

$$\hat{A}_{a,b} \approx P_{b,0} + P_{b,1}\hat{x}_a + P_{b,2}\hat{y}_a + P_{b,3}\hat{x}_a^2 + P_{b,4}\hat{x}_a\hat{y}_a \forall\, a \in \{1 \ldots W\} \quad (38)$$

A number of alternative methods may be employed to determine the matrix $Q_b$. According to Equation (28), the matrix $Q_b$ determines the value of A(k, b) whenever $s_b$=0. This occurs whenever no dominant direction of arrival is determined form the characteristic vector C(k, b).

According to one example of a method, the matrix $Q_b$ is determined according to the average value of $\hat{A}_{a,b}$, according to:

$$Q_b = \frac{1}{W} \sum_{a=1}^{W} \hat{A}_{a,b} \quad (39)$$

According to an alternative example of a method, the matrix $Q_b$ is determined according to the average value of $\hat{A}_{a,b}$, with an empirically defined scale-factor, β, according to:

$$Q_b = \frac{\beta}{W} \sum_{a=1}^{W} \hat{A}_{a,b} \quad (40)$$

Use of Decorrelation

Whenever $s_b$ approaches $s_b$=0, this indicates that the characteristic vector, C(k, b), does not contain information that indicates a dominant direction of arrival. In this situation, the M microphone input signals will be mixed, according to the [N×M] mixing matrix: A(k, b)=$Q_b$. IF N>M, the N-channel output signals will exhibit inter-channel correlation that, in some cases, will sound undesirable.

Figure 8:
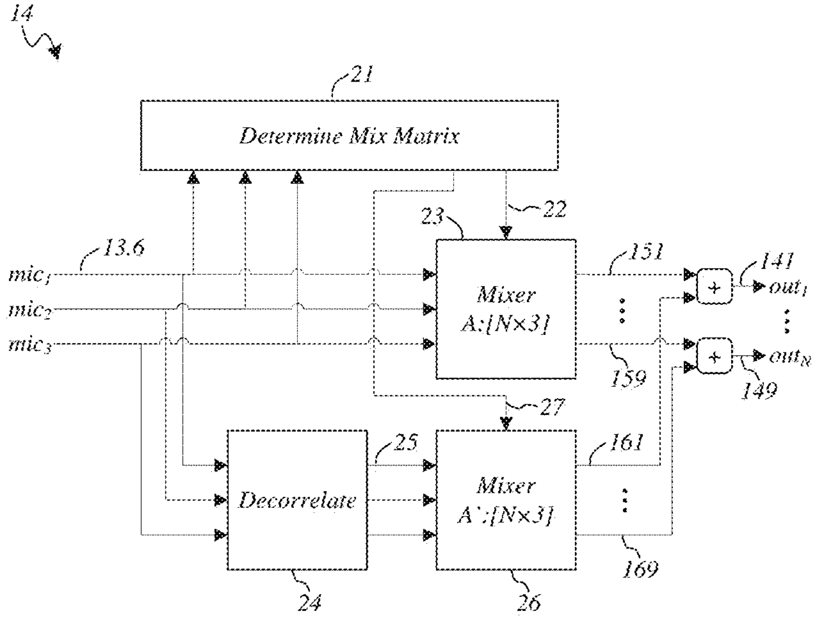
FIG. 8 illustrates an example of processing of one band according to a matrix, including decorrelation in accordance with example embodiments disclosed herein.

In one example of a method, the matrix A is augmented with a second matrix, A', as shown in FIG. 8. According to this method, the outputs, for example 141 . . . 149) are formed by combining the intermediate signals (151 . . . 159) produced by the mixing matrix A, 23, with the intermediate signals (161 . . . 169) produced by the mixing matrix A, 26.

Matrix mixer 26 receives inputs from intermediate signals, for example 25, that are output from a decorrelate process, 24.

In one example of a method, the matrix A' is determined, during time block k for band b, according to:

$$A'(k, b) = (1 - s_b p_b)Q'_b \tag{41}$$

The decorrelation matrix, $Q'_b$ may be determined by a number of different methods. The columns of the matrix, $Q'_b$ should be approximately orthogonal to each other, and each column of $Q'_b$ should be approximately orthogonal to each column of $Q_b$.

In one example of a method, the elements of $Q'_b$ may be implemented by copying the elements of $Q_b$ with alternate rows negated:

$$(Q'_b)_{n,m} = (-1)^n (Q_b)_{n,m} \forall\, n \in \{1 \ldots N\}, m \in \{1 \ldots M\} \tag{42}$$

Further Details of the Characteristics Vector

According to Equations (5) and (6), the time-smoothed covariance matrix, Cov(k, ω), represents 2nd-order statistical information derived from the microphone input signals.

Cov(k, ω) will be a [M×M] matrix. By way of example, $\text{Cov}(k, \omega)_{1,2}$ represents the covariance of microphone channel 1 compared to microphone channel 2. In particular, at time block k, this covariance element represents a complex frequency response (a function of ω). Furthermore, the phase of the microphone 1 signal, relative to microphone 2, is represented as $\text{phase}_{1,2}=\arg(\text{Cov}(k, \omega)_{1,2})$.

When microphone 1 and microphone 2 are physically displaced around the audio capture device, a group-delay offset may exist between the signals in the two microphones, as per FIG. 3. This group delay offset will result in a phase difference between the microphones that varies as a linear function of w. Hence, when an acoustic source creates an acoustic wave that is incident on the capture device, it is reasonable to expect that the group-delay between the microphone signals will be a function of the direction of arrival of the wave from the acoustic source.

It is known, in the art, that group delay is related to phase according to the derivative:

$$GD = -\frac{dphase}{d\omega}.$$

We may therefore represent the group delay between microphones 1 and 2 according to the approximation:

$$GD_{1,2} \approx -\frac{\arg(\text{Cov}(k, \omega + \delta_\omega)_{1,2}) - \arg(\text{Cov}(k, \omega - \delta_\omega)_{1,2})}{2\delta_\omega} \tag{43}$$

This tells us that the quantity $\arg(\text{Cov}(k, \omega+\delta_\omega)_{1,2})-\arg(\text{Cov}(k, \omega-\delta_\omega)_{1,2})$ contains the information that determines our group-delay estimate. Furthermore, $$\arg(\text{Cov}(k, \omega + \delta_\omega)_{1,2}) - \arg(\text{Cov}(k, \omega - \delta_\omega)_{1,2}) = \arg\left(\text{Cov}(k, \omega + \delta_\omega)_{1,2}\overline{\text{Cov}(k, \omega - \delta_\omega)_{1,2}}\right) \tag{44}$$

so, the quantity $\text{Cov}(k, \omega+\delta_\omega)_{1,2}\text{Cov}(k, \omega-\delta_w)_{1,2}$ also contains the information at represents the group delay difference between microphones 1 and 2.

Hence, according to one example method, Equation (7) determines the delay-covariance matrix such that each element of the matrix has it's magnitude taken from the magnitude of the time-smoothed covariance matrix |Cov(k, w)|, and it's phase taken from the group-delay representative quantity, $\text{Cov}(k, \omega+\delta_\omega)_{1,2}\overline{\text{Cov}(k,\omega-\delta_\omega)_{1,2}}$.

The value of $\delta_\omega$ is chosen so that, for the expected range of group-delay differences between microphones (for all expected directions of arrival), the quantity: $\arg(\text{Cov}(k, \omega+\delta_\omega)_{1,2}\overline{\text{Cov}(k,\omega-\delta_\omega)_{1,2}})$ will lie in the approximate range $$\left[-\frac{2\pi}{3} \ldots \frac{2\pi}{3}\right].$$

According to the methods described above, the diagonal entries of the delay-covariance matrix will be determined according to the amplitudes of the microphone input signals, without any group-delay information. The group-delay information, as it relates to the relative delay between different microphones, is contained in the off-diagonal entries of the delay-covariance matrix.

In alternative examples of a method, the off diagonal entries of the delay-covariance matrix may be determined according to any method whereby the delay between microphones is represented. For a pair of microphone channels i and j (where i≠j), $D''(k, \omega)_{i,j}$ may be computed according to methods that include, but are not limited to, the following:

$$D''(k, \omega) = \frac{\text{Cov}(k, \omega + \delta_\omega) \times \overline{\text{Cov}(k, \omega - \delta_\omega)}}{\sqrt{\left|\text{Cov}(k, \omega + \delta_\omega) \times \overline{\text{Cov}(k, \omega - \delta_\omega)}\right|}} \tag{45}$$

It is to be understood that the components of the methods and systems of 14 shown in FIGS. 6-8 and/or the system 21 shown in FIG. 9 may be a hardware module or a software unit module. For example, in some embodiments, the system may be implemented partially or completely as software and/or in firmware, for example, implemented as a computer program product embodied in a computer readable medium. Alternatively, or in addition, the system may be implemented partially or completely based on hardware, for example, as an integrated circuit (IC), an application-specific integrated circuit (ASIC), a system on chip (SOC), a field programmable gate array (FPGA), and so forth. The scope of the subject matter disclosed herein is not limited in this regard.

Figure 10:
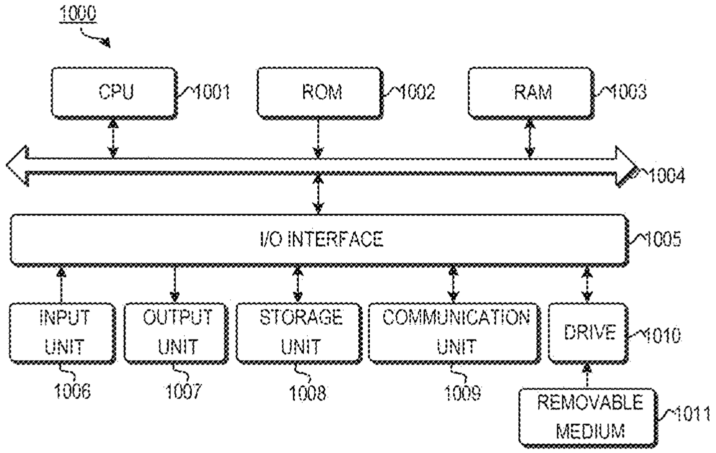
FIG. 10 is a block diagram of an example computer system suitable for implementing example embodiments disclosed herein.

FIG. 10 depicts a block diagram of an example computer system 1000 suitable for implementing example embodiments disclosed herein. That is, a computer system contained in, for example, the acoustic capture device 10 (e.g., a smart phone, tablet or the like) shown in FIG. 1. As depicted in FIG. 10, the computer system 1000 includes a central processing unit (CPU) 1001 which is capable of performing various processes in accordance with a program stored in a read only memory (ROM) 1002 or a program loaded from a storage unit 1008 to a random access memory (RAM) 1003. In the RAM 1003, data required when the CPU 1001 performs the various processes or the like is also stored as required. The CPU 1001, the ROM 1002 and the RAM 1003 are connected to one another via a bus 1004. An input/output (I/O) interface 1005 is also connected to the bus 1004.

The following components are connected to the I/O interface 1005: an input unit 1006 including a keyboard, a mouse, or the like; an output unit 1007 including a display such as a cathode ray tube (CRT), a liquid crystal display (LCD), or the like, and a loudspeaker or the like; the storage unit 1008 including a hard disk or the like; and a communication unit 1009 including a network interface card such as a LAN card, a modem, or the like. The communication unit 1009 performs a communication process via the network such as the internet. A drive 1010 is also connected to the I/O interface 1005 as required. A removable medium 1011, such as a magnetic disk, an optical disk, a magneto-optical disk, a semiconductor memory, or the like, is mounted on the drive 1010 as required, so that a computer program read therefrom is installed into the storage unit 1008 as required.

Specifically, in accordance with example embodiments disclosed herein, the systems and methods described above with reference to FIGS. 6 to 9 may be implemented as computer software programs. For example, example embodiments disclosed herein include a computer program product including a computer program tangibly embodied on a machine readable medium, the computer program including program code for performing the systems or methods. In such embodiments, the computer program may be downloaded and mounted from the network via the communication unit 1009, and/or installed from the removable medium 1011.

Generally speaking, various example embodiments disclosed herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments disclosed herein are illustrated and described as block diagrams, flowcharts, or using some other pictorial representation, it would be appreciated that the blocks, apparatus, systems, techniques or methods disclosed herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, example embodiments disclosed herein include a computer program product including a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Computer program code for carrying out methods disclosed herein may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server. The program code may be distributed on specially-programmed devices which may be generally referred to herein as "modules". Software component portions of the modules may be written in any computer language and may be a portion of a monolithic code base, or may be developed in more discrete code portions, such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. Further, it is well known to the skilled person that communication media typically embodies computer readable instructions, data structures, program modules or other data in a modulated data signal such as a carrier wave or other transport mechanism and includes any information delivery media.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter disclosed herein or of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination.

Various modifications, adaptations to the foregoing example embodiments disclosed herein may become apparent to those skilled in the relevant arts in view of the foregoing description, when read in conjunction with the accompanying drawings. Any and all modifications will still fall within the scope of the non-limiting and example embodiments disclosed herein. Furthermore, other embodiments disclosed herein will come to mind to one skilled in the art to which those embodiments pertain having the benefit of the teachings presented in the foregoing descriptions and the drawings.

It would be appreciated that the embodiments of the subject matter disclosed herein are not to be limited to the specific embodiments disclosed and that modifications and other embodiments are intended to be included within the scope of the appended claims. Although specific terms are used herein, they are used in a generic and descriptive sense only and not for purposes of limitation.

Accordingly, the present invention may be embodied in any of the forms described herein. For example, the following enumerated example embodiments (EEEs) describe some structures, features, and functionalities of some aspects of the present invention.

EEE 1. A method for determining a multichannel audio output signal, composed of two or more output audio channels, from a multi-microphone input signal, composed of at least two microphone signals, comprising:

determining a mixing matrix, based on characteristics of the multi-microphone input signal, wherein the multi-microphone input signal is mixed according to the mixing matrix to produce the multichannel audio output signal.

EEE 2. A method according to EEE 1 wherein the method for determining the mixing matrix further comprises;

determining a dominant direction of arrival and a steering strength parameter, based on characteristics of said multi-microphone input signal; and determining the mixing matrix, based on said dominant direction of arrival and said steering strength parameter.

EEE 3. A method according to EEE 1 or EEE 2, wherein the characteristics of the multi-microphone input signal includes the relative amplitudes between one or more pairs of said microphone signals.

EEE 4. A method according to any of the previous EEEs wherein said characteristics of said multi-microphone input signal includes the relative group-delay between one or more pairs of said microphone signals.

EEE 5. A method according to any of the previous EEEs wherein said matrix is modified as a function of time, according to characteristics of said multi-microphone input signal at various times.

EEE 6. A method according to any of the previous EEEs wherein said matrix is modified as a function of frequency, according to characteristics of said multi-microphone input signal in various frequency bands.

EEE 7. A computer program product for processing an audio signal, comprising a computer program tangibly embodied on a machine readable medium, the computer program containing program code for performing the method according to any of EEEs 1-6.

EEE 8. A device comprising:

a processing unit; and a memory storing instructions that, when executed by the processing unit, cause the device to perform the method according to any of EEEs 1-6.

EEE 9. An apparatus, comprising:

circuitry adapted to cause the apparatus to at least:

determine a mixing matrix, based on characteristics of the multi-microphone input signal, wherein the multi-microphone input signal is mixed according to the mixing matrix to produce the multichannel audio output signal.

EEE 10. A program storage device readable by a machine, tangibly embodying a program of instructions executable by the machine for causing performance of operations, said operations comprising:

determine a mixing matrix, based on characteristics of the multi-microphone input signal, wherein the multi-microphone input signal is mixed according to the mixing matrix to produce the multichannel audio output signal.

The invention claimed is:

1. A method of processing audio, comprising:

receiving an input signal including a plurality of microphone signals;

determining a mixing matrix based on characteristics of the input signal; and mixing the input signal according to the mixing matrix to produce a multichannel audio output signal including a plurality of output channels, wherein determining the mixing matrix comprises:

calculating a covariance matrix based on a frequency representation of the input signal, wherein the covariance matrix is smoothed over a predetermined time window;

based on the covariance matrix:

determining a vector representative of a dominant direction of arrival and a parameter representative of a degree to which the input signal appears to contain a dominant direction of arrival; and determining the mixing matrix based on a weighted sum of a first matrix that is independent of the dominant direction of arrival and based on a second matrix that correlates to the dominant direction of arrival, wherein the first matrix is weighted by a first weight that decreases for an increase in value of the parameter, and wherein the second matrix is weighted by a second weight that increases for an increase in value of the parameter.

2. A system comprising:

one or more processors; and a non-transitory computer readable medium storing instructions that, when executed by the one or more processors, cause the one or more processors to perform operations of processing audio, the operations comprising:

receiving an input signal including a plurality of microphone signals;

determining a mixing matrix based on characteristics of the input signal; and mixing the input signal according to the mixing matrix to produce a multichannel audio output signal including a plurality of output channels, wherein determining the mixing matrix comprises:

calculating a covariance matrix based on a frequency representation of the input signal, wherein the covariance matrix is smoothed over a predetermined time window;

based on the covariance matrix:

determining a vector representative of a dominant direction of arrival and a parameter representative of a degree to which the input signal appears to contain a dominant direction of arrival; and determining the mixing matrix based on a weighted sum of a first matrix that is independent of the dominant direction of arrival and based on a second matrix that correlates to the dominant direction of arrival, wherein the first matrix is weighted by a first weight that decreases for an increase in value of the parameter, and wherein the second matrix is weighted by a second weight that increases for an increase in value of the parameter.

* * * * *